3,291,836
HOMOESTRENES
John S. Tadanier, Chicago, and John Wayne Cole, Deerfield, Ill., assignors to Abbott Laboratories, Chicago, Ill., a corporation of Illinois
No Drawing. Filed Mar. 2, 1964, Ser. No. 348,842
3 Claims. (Cl. 260—586)

The present invention is directed to new steroids. In particular, it is concerned with 3,7,17-substituted B-homoestrenes.

The new substituted B-homoestrenes have the generic formula

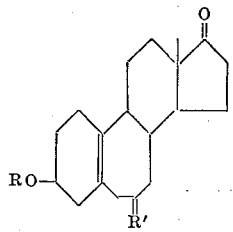

wherein R is hydrogen, HZ, PhZ or HZCO, with Ph representing phenyl and Z representing a saturated alkylene radical of 1 to 7 carbon atoms, and wherein R' is oxygen,

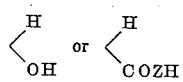

These new compounds exhibit the phenomenon of having substantially no sex-hormone activity but are useful growth-promoting and growth-regulating agents when administered to warm-blooded animals.

The above compounds, according to the present invention, can be made by treating a 3β-alkoxy-(or aralkoxy or acyloxy)-6-hydroxy-5β,19-cycloandrostan-17-one in an inert, water-miscible, organic solvent with an aqueous acid of the formula R″SO₃H wherein R″ is HO, HZ or PhZ, and extracting the formed homoestrene with an inert, water-immiscible, organic solvent. The term "inert" used herein is meant to express that the solvent so identified has no reactivity toward the ingredients present in the reaction mixture. The starting material used in this reaction is obtained by treating the corresponding 3β-substituted 19-hydroxyandrost-5-en-17-one with methanesulfonyl chloride in pyridine which forms 3β-substituted 19-methanesulfonoxyandrost-5-en-17-one, which subsequently is hydrolyzed with water, an inert organic solvent, and potassium acetate to the 3β-substituted 6α-hydroxy-5β,19-cycloandrostan-17-one. The 3β-alkoxy-7β-hydroxy-B-homoestr-5(10)-en-17-one can easily be oxidized with chromic anhydride to 3β-alkoxy-B-homoestr-5(10)-ene-7,17-dione. When the starting material for the new process is the 3β-benzyloxy-6α-hydroxy-5β,19-cycloandrostan-17-one, 3β-benzyloxy-7β-hydroxy-B-homoestr-5(10)-en-17-one is obtained.

The 3β-benzyloxy-7β-hydroxy-B-homoestr-5(10)-en-17-one and 3β-benzyloxy-B-homoestr-5(10)-ene-7,17-dione can be converted into the corresponding 3β-hydroxy analogs by hydrogenating in the presence of a 1% palladium on carbon catalyst at room temperature and atmospheric pressure.

The hydroxy substituents in the above named new compounds can easily be esterified with lower fatty acids such as acetic acid, propionic acid, hexanoic acid and the like, either by using the anhydride of such an acid or the corresponding acyl chloride. In this manner, 3β-acyloxy-B-homoestr-5(10) - ene - 7,17-dione, 3β,7β-diacyloxy-B-homoestr-5(10)-en-17-one, and 3β-alkoxy-(or phenylalkoxy)-7β-acyloxy-B-homoestr-5(10)-en-17-one can be obtained. The acyl groups referred to above are saturated fatty acid chains containing from 1 to 7 carbon atoms.

To illustrate the procedures of the present invention, reference is made to the following examples which are not meant to limit the invention. In these examples, where solvent mixtures are followed by proportions, it signifies that mixtures of such solvents with such ratios are used; where no ratio is indicated after the solvent identification it means that the first solvent is initially used alone and that the solution is then mixed with the second solvent.

Example 1.—3β-methoxy-7β-hydroxy-B-homoestr-5(10)-en-17-one

A solution of 1.24 grams of 3β-methoxy-6α-hydroxy-5β,19-cycloandrostan-17-one in 135 ml. of acetone is treated with 34 ml. of a solution prepared from 2.5 ml. of concentrated sulfuric acid and 60 ml. of water. After refluxing this mixture for 2 hours, it is poured into one liter of water and the reaction product is worked up by extraction with ether to yield 1.17 grams of a crystalline product. This material is chromatographed on a column filled with 100 grams of neutral activity III alumina, using 600 ml. of ether/benzene (1:1) as eluate. A yield of 936.1 mg. of 3β-methoxy-7β-hydroxy-B-homoestr-5(10)-en-17-one melting at 111.5–115.5° C. is obtained. An analytical sample, prepared by recrystallization from benzene/petroleum ether, melts at 116–118° C., has $[\alpha]_D^{25}$ of +50.8° as a 1% solution in chloroform, and shows $\epsilon=6130$ at 205 mμ. The elemental analysis is in good agreement with the values calculated from the empirical formula $C_{20}H_{30}O_3$.

When the above 7β-hydroxy compound is dissolved in anhydrous pyridine and the solution is treated at room temperature with 0.3 volume of acetic anhydride for 20 hours, followed by dropwise addition of water to precipitate the product, 3β-methoxy-7β-acetoxy-β-homoestr-5(10)-en-17-one is obtained.

By substituting the starting material used above with 3β-benzyloxy-6α-hydroxy-5β,19 - cycloandrostan-17-one, similar yields of 3β-benzyloxy-7β-hydroxy-B-homoestr-5(10)-en-17-one are obtained. The formed 3β-benzyloxy-7β-hydroxy-B-homoestr-5(10)-en-17-one dissolved in 95% ethanol is shaken with gaseous hydrogen in the presence of 1% palladium on charcoal (prepared as described in Organic Synthesis Collective Vol. III, page 686, Method C, of 1955) at room temperature and at atmospheric pressure until approximately one molar equivalent of hydrogen is taken up. The catalyst is then removed by filtration and the formed 3β,7β-dihydroxy-B-homoestr-5(10)-en-17-one is obtained by evaporating the filtrate. This 3β,7β-dihydroxy compound upon acylation with pyridine and acetic anhydride by the above procedure gives 3β,7β-diacetoxy-B-homoestr-5(10)-en-17-one of the formula $C_{23}H_{32}O_5$. By replacing acetic anhydride with another lower fatty acid anhydride or a corresponding acyl chloride, other esters of the above 7β-hydroxy and 3β,7β-dihydroxy compounds can be prepared by essentially the same procedure.

Example 2.—3β-methoxy-B-homoestr-5(10)-ene-7,17-dione

To a solution of 317.3 mg. of 3β-methoxy-7β-hydroxy-B-homoestr-5(10)-en-17-one in 2.4 ml. of pyridine is added 5 ml. of a complex prepared from 944.2 mg. of chromic anhydride and 8.6 ml. of pyridine. The resulting suspension is allowed to stand at room temperature for 20 hours, whereupon the reaction products are extracted with ether. The ether extract is filtered through a celite mat, washed with several 30-ml. portions of water, and dried over anhydrous magnesium sulfate. After evaporation of the ether, 210.3 mg. of a crystalline solid is obtained, which melts at 133–143° C. This product is chromatographed on a column of 20 grams of neutral, activity III alumina, and eluted with 450 ml. of benzene, yielding 143 mg. of 3β-methoxy-B-homoestr-5(10)-ene-7,17-dione, melting at 145–152° C., as a pure white solid. An analytical sample recrystallized from methanol-water melts at 150–152° C., has $[\alpha]_D^{28}$ of $-112°$ (1% chloroform solution), $\lambda_{max.}$ 287 m$\mu$ ($\epsilon$ 387); $\epsilon$ 5690 at 205 m$\mu$.

When the starting material of this example is replaced with the corresponding 3β-benzyloxy compound, 3β-benzyloxy-B-homoestr-5(10)-ene-7,17-dione is obtained, in the manner described above.

It will be understood by those skilled in the art that other strong water-soluble acids may replace the sulfuric acid used in the process of making the new homoestrenes. For example, in Example 1, sulfuric acid may be replaced by equivalent amounts of methanesulfonic acid or benzenesulfonic acid to give the same compound as described above. Also, by replacing the steroidal starting material in Example 1 with the corresponding 6β-hydroxy compound, the same result is obtained.

Others may practice the invention in any of the numerous ways which will be obvious to those skilled in the art. All such practice of the invention is considered a part hereof provided it falls within the scope of the appended claims.

We claim:
1. A compound of the formula

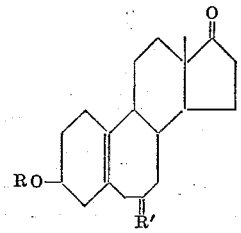

wherein R is selected from the group consisting of hydrogen, HZ, $C_6H_5Z$ and HZCO, with Z representing a saturated alkylene radical of 1–7 C atoms, and wherein R' is selected from the group consisting of oxygen,

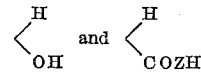

2. The compound of claim 1 wherein R is methyl and R' is

3. The compound of claim 1 wherein R is methyl and R' is oxygen.

References Cited by the Examiner

FOREIGN PATENTS 1,341,771  9/1963  France.

LEON ZITVER, *Primary Examiner.*

BERNARD HELFIN, *Examiner.*

M. M. JACOB, *Assistant Examiner.*